US012162131B2

(12) United States Patent
Dance et al.

(10) Patent No.: US 12,162,131 B2
(45) Date of Patent: *Dec. 10, 2024

(54) HOUSING CLAMP FOR A POWER TOOL

(71) Applicant: Snap-on Incorporated, Kenosha, WI (US)

(72) Inventors: William Berry Dance, Murphy, NC (US); Johnathan Tyler Bennett, Murphy, NC (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,565

(22) Filed: May 12, 2023

(65) Prior Publication Data

US 2023/0278188 A1 Sep. 7, 2023

Related U.S. Application Data

(63) Continuation of application No. 16/890,433, filed on Jun. 2, 2020, now Pat. No. 11,691,261.

(51) Int. Cl.
*B25F 5/02* (2006.01)

(52) U.S. Cl.
CPC .................................... *B25F 5/02* (2013.01)

(58) Field of Classification Search
CPC ........................................................ B25F 5/02
See application file for complete search history.

(56) References Cited

U.S. PATENT DOCUMENTS 3,476,960 A 11/1969 Rees
3,871,138 A * 3/1975 Welsch ................. B24B 23/022 279/46.2
3,908,139 A * 9/1975 Duncan, Jr. ............ H02K 7/145 310/43

(Continued)

FOREIGN PATENT DOCUMENTS

CN 101220859 A 7/2008
CN 201913628 U 8/2011

(Continued)

OTHER PUBLICATIONS

Australian Examination Report No. 1 for corresponding AU Application No. 2021203133 dated Dec. 17, 2021, 6 pages.

(Continued)

*Primary Examiner* — Lucas E. A. Palmer
(74) *Attorney, Agent, or Firm* — Taft Stettinius & Hollister LLP

(57) ABSTRACT

The present invention relates to a housing clamp for a power tool housing, such as a drill, router, grinder, impact wrench, ratchet wrench, screwdriver, or other powered tool. The housing clamp includes a circumferential flange and recess that extends at an angle. When the housing clamp is installed, the housing clamp couples two portions of a power tool housing together. As the housing clamp is tightened onto the housing portions, the flange loads the housing with even pressure around its circumference providing a clamping load. The housing clamp provides even pressure around a large area at a working end of the tool, allowing the tool to be thinner in a dimensionally critical area.

13 Claims, 9 Drawing Sheets

(56) References Cited

U.S. PATENT DOCUMENTS

| | | | | |
|---|---|---|---|---|
| 4,078,869 | A * | 3/1978 | Honeycutt | B25F 5/021 33/286 |
| 4,545,440 | A * | 10/1985 | Treadway | B21D 31/02 173/132 |
| 4,730,134 | A * | 3/1988 | Sistare | B23B 45/001 310/91 |
| 4,976,173 | A * | 12/1990 | Yang | B25F 3/00 81/177.8 |
| 5,028,858 | A * | 7/1991 | Schnizler | B23B 45/02 320/136 |
| 5,033,552 | A * | 7/1991 | Hu | B25B 21/00 241/37.5 |
| 5,281,056 | A * | 1/1994 | Lawson | B25F 5/02 408/72 R |
| 5,422,558 | A * | 6/1995 | Stewart | H02J 7/0013 320/120 |
| 5,867,007 | A * | 2/1999 | Kim | H02J 7/0024 320/118 |
| 6,352,127 | B1 * | 3/2002 | Yorde | B25B 21/002 173/217 |
| 7,165,920 | B2 * | 1/2007 | Baber | B27C 1/10 30/500 |
| 7,604,528 | B2 | 10/2009 | Lo et al. | |
| 7,665,541 | B2 * | 2/2010 | Sakai | B25F 5/029 173/217 |
| 7,770,660 | B2 | 8/2010 | Wisniewski et al. | |
| 7,980,324 | B2 | 7/2011 | Roberts et al. | |
| 8,235,137 | B2 * | 8/2012 | Walker | B25B 21/00 173/217 |
| 8,547,066 | B2 * | 10/2013 | Bieler | H02J 7/0013 320/112 |
| 8,803,483 | B2 * | 8/2014 | Nagase | H02J 7/0031 320/135 |
| 8,907,597 | B2 * | 12/2014 | Kim | B60L 58/18 320/124 |
| 9,545,713 | B2 * | 1/2017 | Johnson | B25F 5/006 |
| 9,796,073 | B2 | 10/2017 | Yaschur et al. | |
| 9,878,432 | B2 | 1/2018 | Becker et al. | |
| 10,850,383 | B1 * | 12/2020 | Urban | G05G 1/105 |
| 2003/0089510 | A1 * | 5/2003 | Sugimoto | B25F 5/021 173/117 |
| 2005/0200087 | A1 * | 9/2005 | Vasudeva | B25F 3/00 279/143 |
| 2006/0040599 | A1 * | 2/2006 | Young | B25F 5/00 451/359 |
| 2006/0126249 | A1 * | 6/2006 | Boling | H02J 7/0031 361/103 |
| 2007/0256914 | A1 * | 11/2007 | Lohr | B25B 23/18 200/5 A |
| 2008/0023520 | A1 * | 1/2008 | Marshall | B25C 1/04 227/130 |
| 2008/0142236 | A1 * | 6/2008 | Walker | B25F 5/001 173/40 |
| 2008/0271904 | A1 * | 11/2008 | Lin | B25B 21/00 173/20 |
| 2009/0194306 | A1 * | 8/2009 | Johnson | B25F 5/006 173/171 |
| 2010/0102882 | A1 * | 4/2010 | Yoshino | B41J 2/14274 330/251 |
| 2010/0288522 | A1 * | 11/2010 | Sun | B25F 5/02 173/168 |
| 2011/0110734 | A1 * | 5/2011 | Scrimshaw | B23B 31/001 408/16 |
| 2011/0180289 | A1 * | 7/2011 | Kumagai | B25F 5/02 173/90 |
| 2011/0263185 | A1 * | 10/2011 | Nelson | B24B 41/007 451/358 |
| 2012/0073847 | A1 * | 3/2012 | Nagasaka | B25F 5/02 173/217 |
| 2012/0090863 | A1 * | 4/2012 | Puzio | B25B 21/002 173/2 |
| 2012/0182021 | A1 * | 7/2012 | McCoy | G01R 31/3832 324/433 |
| 2012/0319509 | A1 * | 12/2012 | Kishima | B25B 21/00 310/50 |
| 2013/0168121 | A1 * | 7/2013 | Ullrich | B25F 5/02 173/213 |
| 2013/0199811 | A1 * | 8/2013 | Maddilate | B25F 5/02 173/170 |
| 2013/0319152 | A1 * | 12/2013 | Bea | H02K 7/116 74/421 A |
| 2014/0053688 | A1 * | 2/2014 | Yaschur | B25B 13/461 173/217 |
| 2014/0062413 | A1 * | 3/2014 | Kim | H02J 7/0031 320/128 |
| 2014/0265604 | A1 * | 9/2014 | Mergener | H02J 7/0025 307/80 |
| 2015/0096778 | A1 * | 4/2015 | Schneider | B25B 23/0035 174/138 R |
| 2015/0097641 | A1 | 4/2015 | Chen et al. | |
| 2015/0333666 | A1 * | 11/2015 | Miller | B25F 5/00 318/139 |
| 2015/0343583 | A1 * | 12/2015 | McRoberts | B23Q 5/045 173/213 |
| 2016/0354914 | A1 * | 12/2016 | Bartoszek | B25F 5/001 |
| 2016/0354915 | A1 * | 12/2016 | Bartoszek | H02K 5/04 |
| 2017/0167721 | A1 * | 6/2017 | Padget | B25F 5/021 |
| 2017/0291291 | A1 * | 10/2017 | Chen | B25F 5/02 |
| 2018/0152043 | A1 * | 5/2018 | Geng | H01M 50/296 |
| 2018/0345475 | A1 * | 12/2018 | Qian | B25F 5/02 |
| 2019/0160972 | A1 * | 5/2019 | Zeiler | H01M 10/425 |
| 2019/0386497 | A1 * | 12/2019 | Degelau | H01M 10/482 |
| 2020/0153265 | A1 * | 5/2020 | Johnson | H02J 7/007 |
| 2021/0122025 | A1 * | 4/2021 | Cyborski | F16H 57/082 |
| 2021/0370489 | A1 * | 12/2021 | Dance | B25F 3/00 |
| 2022/0009064 | A1 * | 1/2022 | Puzio | F21L 13/00 |
| 2022/0009072 | A1 * | 1/2022 | Patterson | B25F 5/02 |

FOREIGN PATENT DOCUMENTS

| | | | |
|---|---|---|---|
| CN | 203765033 | U | 8/2014 |
| CN | 203944872 | U | 11/2014 |
| CN | 104768712 | A | 7/2015 |
| CN | 107735223 | A | 2/2018 |
| DE | 29813077 | | 11/1998 |
| DE | 10345135 | A1 | 4/2005 |
| DE | 202005007542 | | 8/2005 |
| DE | 10200600543 | | 6/2008 |
| EP | 1862268 | A2 | 12/2007 |
| KR | 101825467 | | 2/2018 |
| TW | M464928 | U | 11/2013 |
| WO | 9722437 | A1 | 6/1997 |
| WO | 2019130982 | A1 | 7/2019 |
| WO | 2019211486 | | 11/2019 |
| WO | 2019065088 | A1 | 6/2021 |
| WO | 2021116076 | A1 | 6/2021 |

OTHER PUBLICATIONS

United Kingdom Combined Search and Examination Report for corresponding UK Application No. GB2107103.0 dated Apr. 20, 2022, 10 pages.

Examination Report for corresponding Application No. GB2107103.0 dated Oct. 25, 2022, 6 pages.

Taiwan Office Action for corresponding Application No. 11220354570 dated Apr. 19, 2023, 10 pages.

Chinese Office Action for corresponding CN Application No. 202110592840.1, dated Aug. 31, 2023, 10 pages.

Chinese Patent Office, Second Office Action issued in corresponding Application No. 202110592840.1, dated Apr. 9, 2024, 12 pp.

* cited by examiner

HOUSING CLAMP FOR A POWER TOOL

CROSS REFERENCES TO RELATED APPLICATIONS

This application is a continuation of, and claims the priority benefit of, U.S. patent application Ser. No. 16/890,433, filed Jun. 2, 2020, the content of which is incorporated herein by reference in its entirety.

TECHNICAL FIELD OF THE INVENTION

The present invention relates to a clamp for coupling portions of a housing for a power tool together to create a unitary housing.

BACKGROUND OF THE INVENTION

Many tools are powered by electric power, via an external power source (such as a wall outlet) or a battery. Drills and impact wrenches, for example, impart torque to a work piece to loosen or tighten the work piece. However, existing tools can be bulky. This size can cause problems when trying to access work pieces that are located in tight or hard to reach places.

For example, current tools have a housing formed by at least two housing portions coupled together by multiple screws, including multiple screws at a forward end or working end of the tool. The screws and screw bosses corresponding to these screws, especially towards the forward or working end of the tool, are normally oriented perpendicular to the housing and cause the tool to be bulky at the forward end of the tool because the screws must be positioned outside of the drivetrain. This bulky size can cause problems when trying to access work pieces that are located in tight or hard to reach places.

SUMMARY OF THE INVENTION

The present invention relates broadly to a housing clamp for a power tool housing, such as a drill, router, grinder, impact wrench, ratchet wrench, screwdriver, or other powered tool. The housing clamp allows a size of a forward or working end of the tool to be reduced by removing screws and screw bosses near the forward end. The housing clamp includes a circumferential flange and recess that extends at an angle. The housing clamp is adapted to couple at least two portions of a power tool housing together to create a unitary housing. As the housing clamp is tightened axially onto the housing portions, the flange and recess loads the housing portions with even pressure or force around its circumference providing a clamping load. The housing clamp provides even pressure around a large area at a working end of the tool, allowing the tool to be thinner in a dimensionally critical area. For example, as the screws that couple the housing clamp are tightened, it causes the housing clamp to move axially onto the housing portions, wherein the flange and recess apply lateral force around the circumference of the ends of the housing portions to clamp the housing portions together. The tighter the screws for the housing clamp are tightened axially onto the tool housing, the larger the lateral force that clamps the housing portions together.

In particular, the present invention broadly comprises a housing clamp for a tool housing having first and second housing portions that form a unitary housing and a motor disposed in the housing. The housing clamp includes an angled flange that forms a recess, wherein the recess is adapted to engage respective ends of the first and second housing portions to couple the first and second housing portions together.

In another embodiment, the present invention broadly comprises a tool. The tool includes a housing formed by at least first and second housing portions, and a motor disposed in the housing. A housing clamp has an angled flange that forms a recess, and the recess is adapted to engage ends of the first and second housing portions to couple the first and second housing portions together.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages, should be readily understood and appreciated.

DETAILED DESCRIPTION

Figure 1:
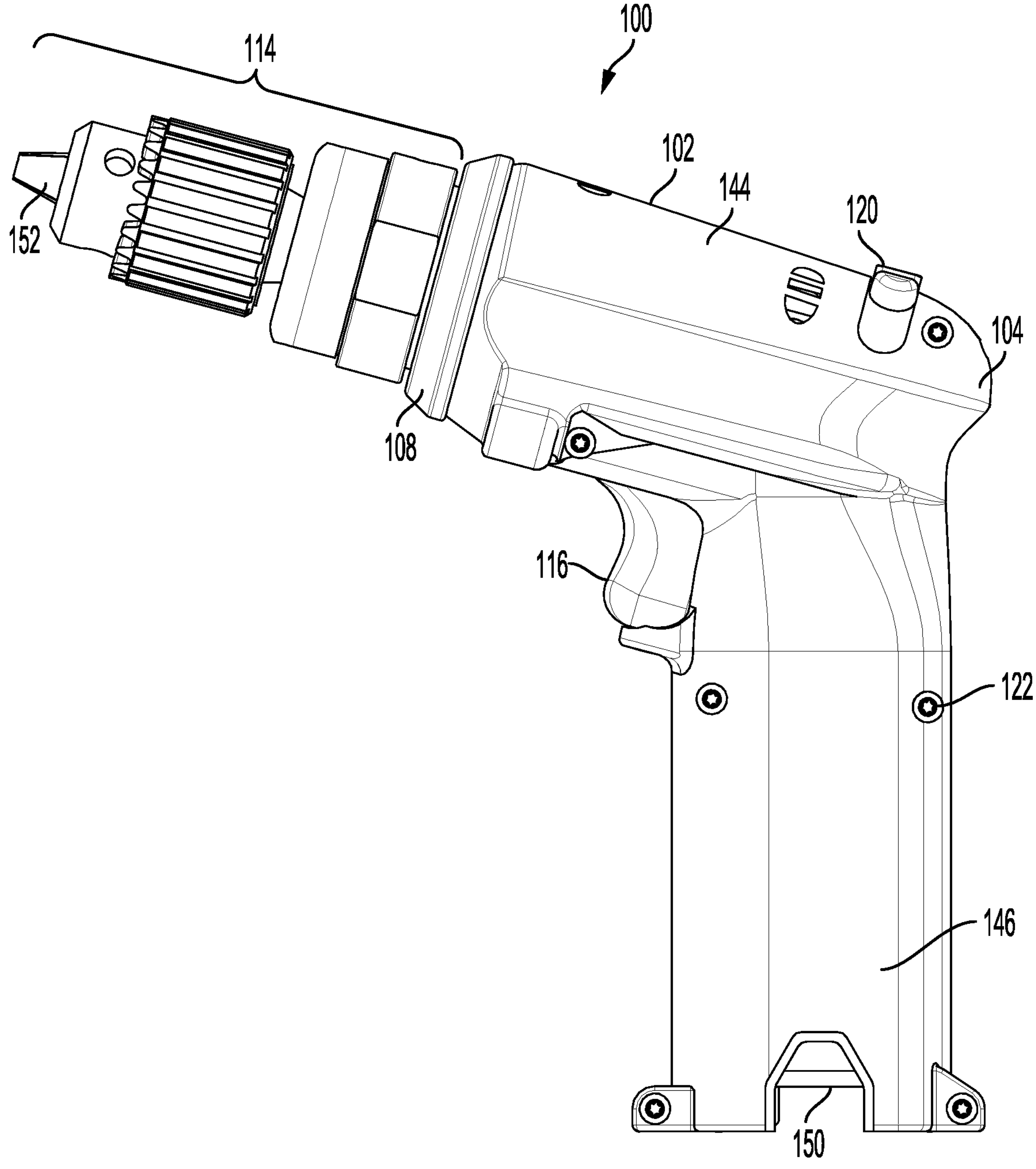
FIG. 1 is a side view of a tool according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a housing clamp for a power tool housing, such as a drill, router, grinder, impact wrench, ratchet wrench, screwdriver, or other powered tool. The housing clamp includes a circumferential flange and recess that extends at an angle. When the housing clamp is installed, the housing clamp couples at least two portions of a power tool housing together to form a unitary housing. As the housing clamp is tightened onto the housing portions, the flange loads the housing with even pressure around its circumference providing a secure clamping load. The housing clamp provides even pressure around a large area at a working end of the tool, allowing the tool to be thinner in a dimensionally critical area. The clamp load can also be greater than that provided by cross plane screws, despite the housing clamp being smaller as a total solution cross-sectionally.

Figure 2:
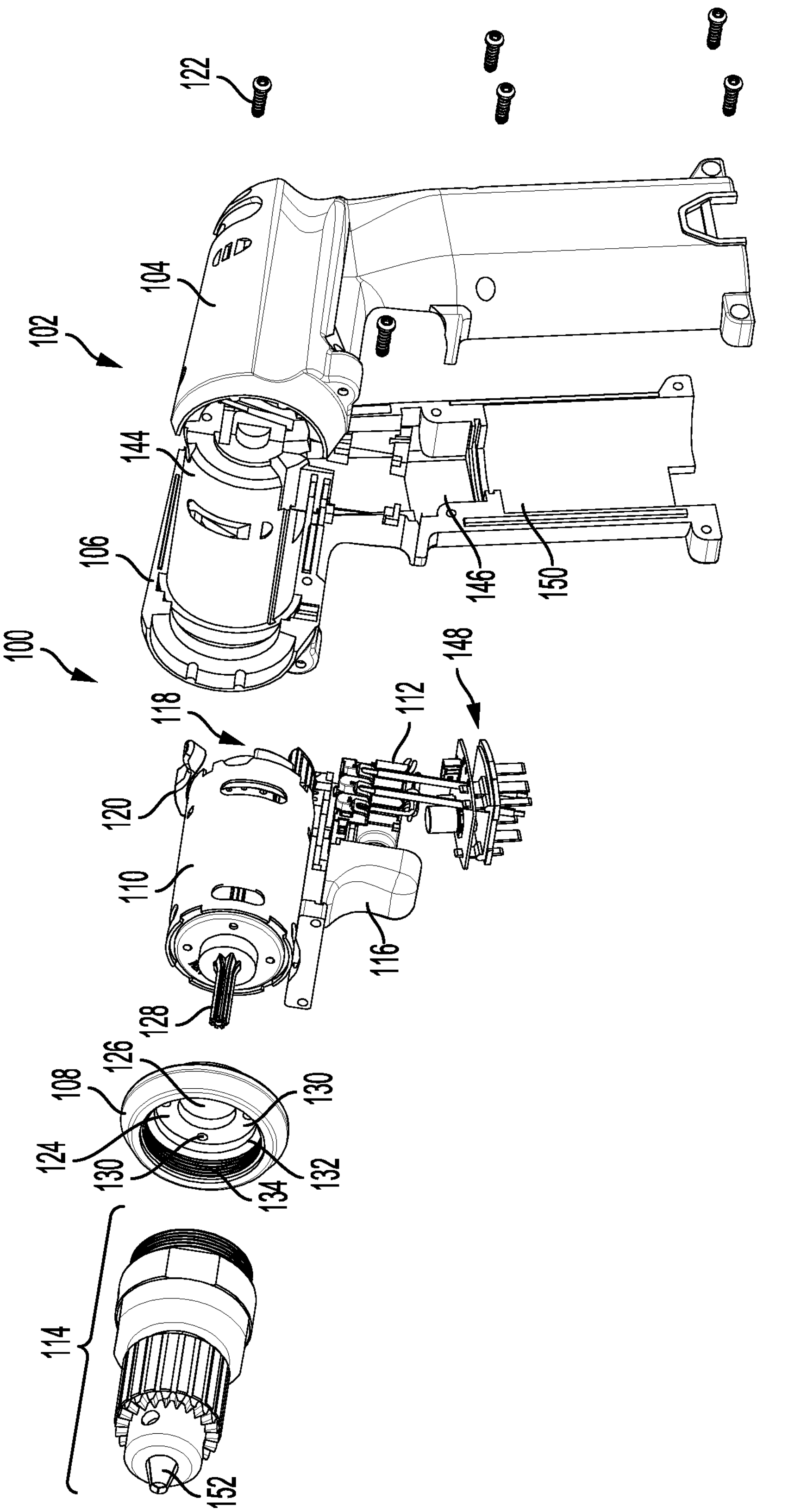
FIG. 2 is a perspective exploded view of the tool of FIG. 1.

Referring to FIGS. 1 and 2, a tool 100 includes a housing 102 having at least first and second housing portions 104 and 106, a housing clamp 108 adapted to couple the first and second housing portions 104 and 106 together, a motor 110 and a switch mechanism 112 disposed in the housing 102, an output nose mechanism 114 coupled to the housing clamp 108 at a working end of the tool 100, an actuatable trigger 116, and a direction selector mechanism 118 with a direction selector (also referred to as an actuator or toggle) 120. The housing clamp 108 loads the housing 102 with even force around its circumference providing a clamping load. The housing clamp 108 provides even pressure around a large area at a working end of the tool 100, allowing the tool 100 to be thinner in a dimensionally critical area.

In an embodiment, the housing 102 is a clamshell-type housing with first and second housing portions 102 and 104 that are coupled together via the housing clamp 108 at a forward end or working end of the housing 102 and one or more fasteners 122 in a handle area of the housing 102. The housing clamp 108 allows a size of the forward or working end of the tool 100 to be reduced by removing screws and screw bosses near the forward end, as compared to prior designs.

Figure 3:
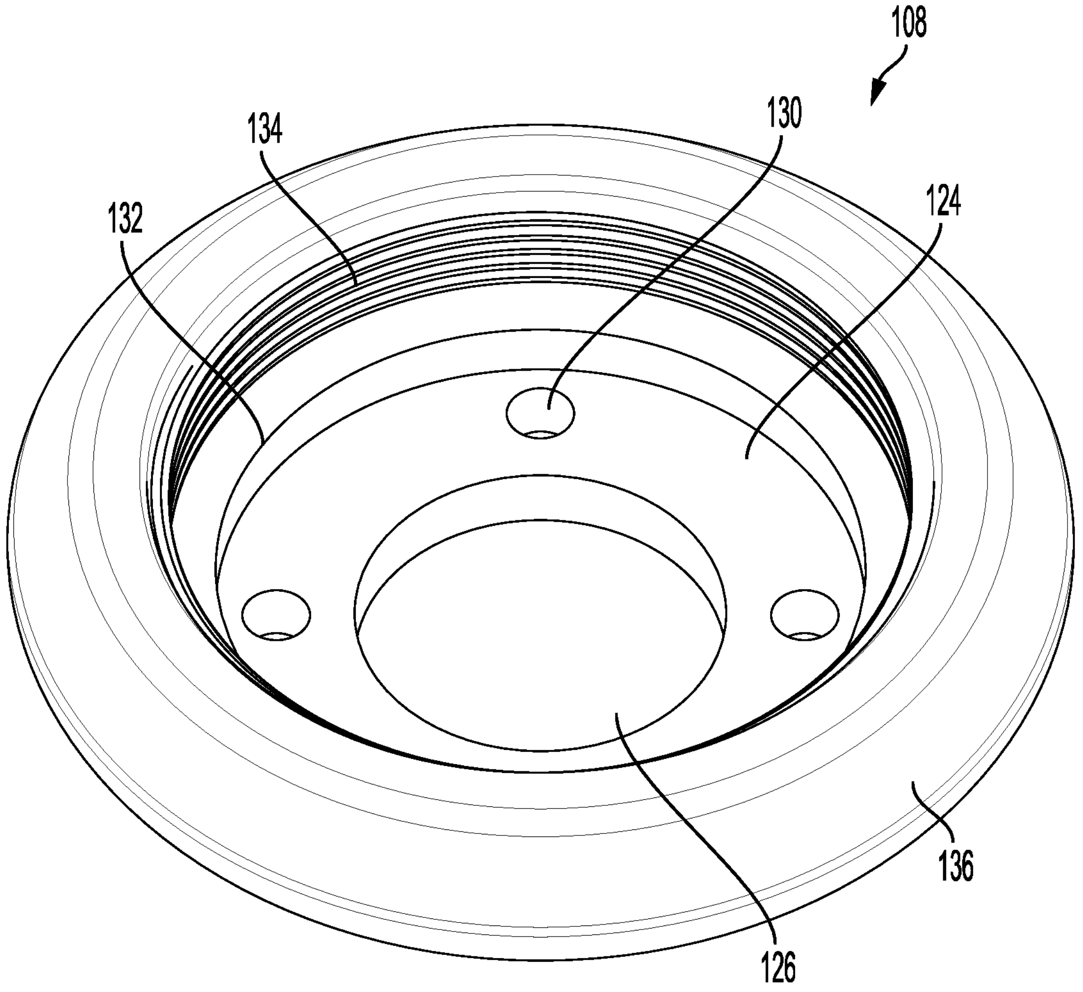
FIG. 3 is a first perspective view of a housing clamp of the tool of FIG. 1.
Figure 4:
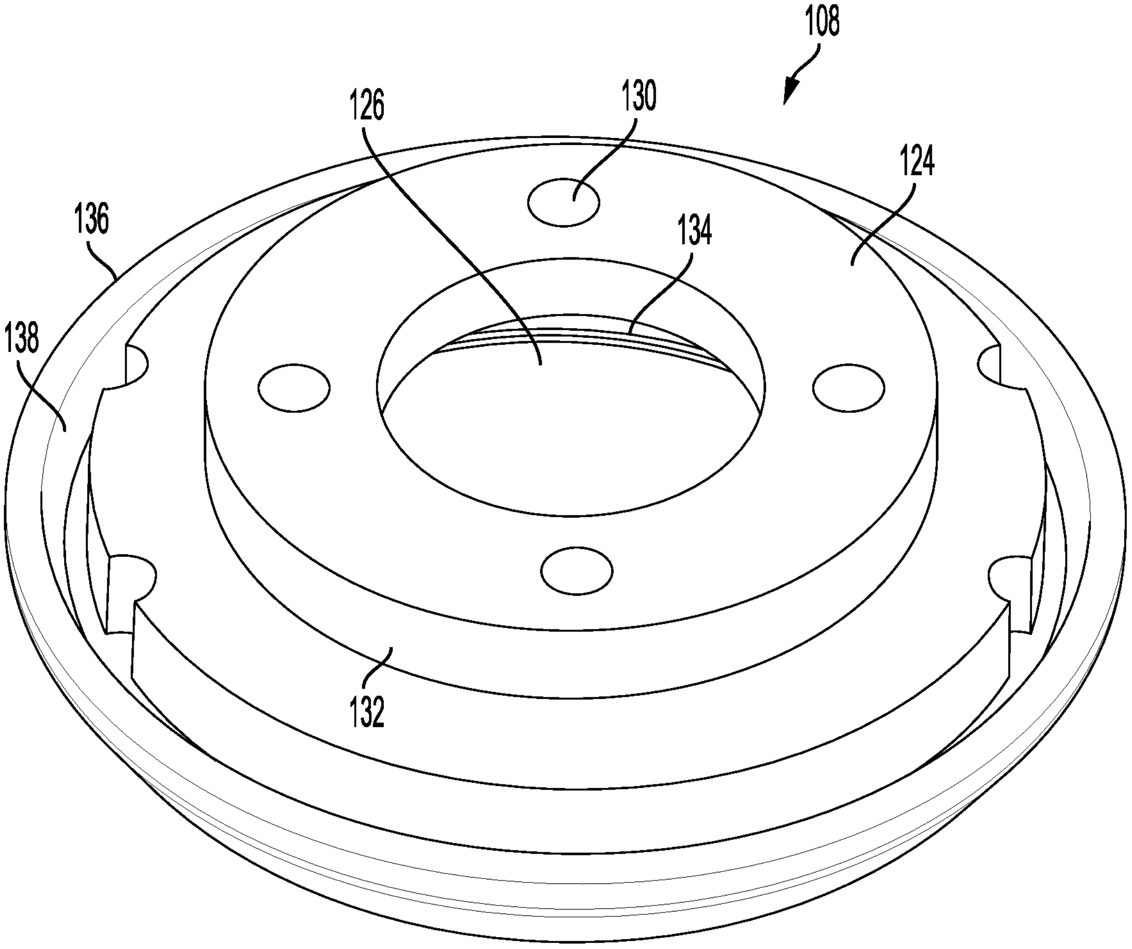
FIG. 4 is a second perspective view of the housing clamp of FIG. 3.
Figure 5:
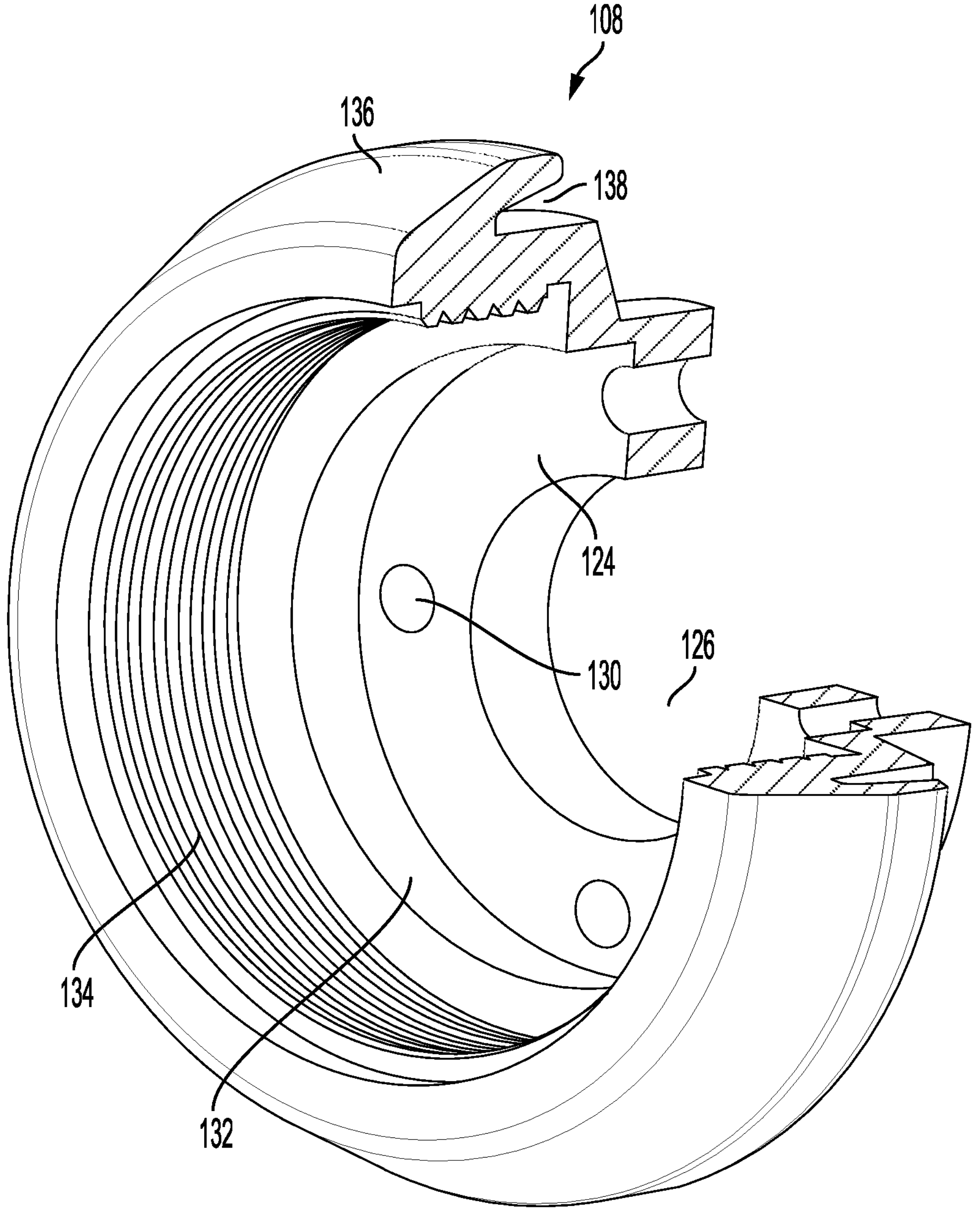
FIG. 5 is a sectioned view of the housing clamp of FIG. 3.

Referring to FIGS. 3-5, the housing clamp 108 includes a base portion 124 including an aperture 126 adapted to allow a shaft 128 of the motor 110 to extend therethrough, and one or more fastener apertures 130. A sidewall 132 extends circumferentially around the base portion 124 outwardly away from the base portion 124. The sidewall 132 may include a threaded portion 134 adapted to couple to the output nose mechanism 114. The sidewall 132 extends from the base portion 124 to an end of the housing clamp 108, and an angled flange 136 extends circumferentially around the side wall 132 and in a direction towards the base portion 124. The flange 136 forms an angled recess 138 between an inner side of the flange 136 and an outer side of the side wall 132. The recess 138 may form an angle $\alpha$ of about 15 to about 25 degrees, and more particularly about 20 degrees. The angled recess 138 may also be in the form of a curved or other type of shape.

Figure 6:
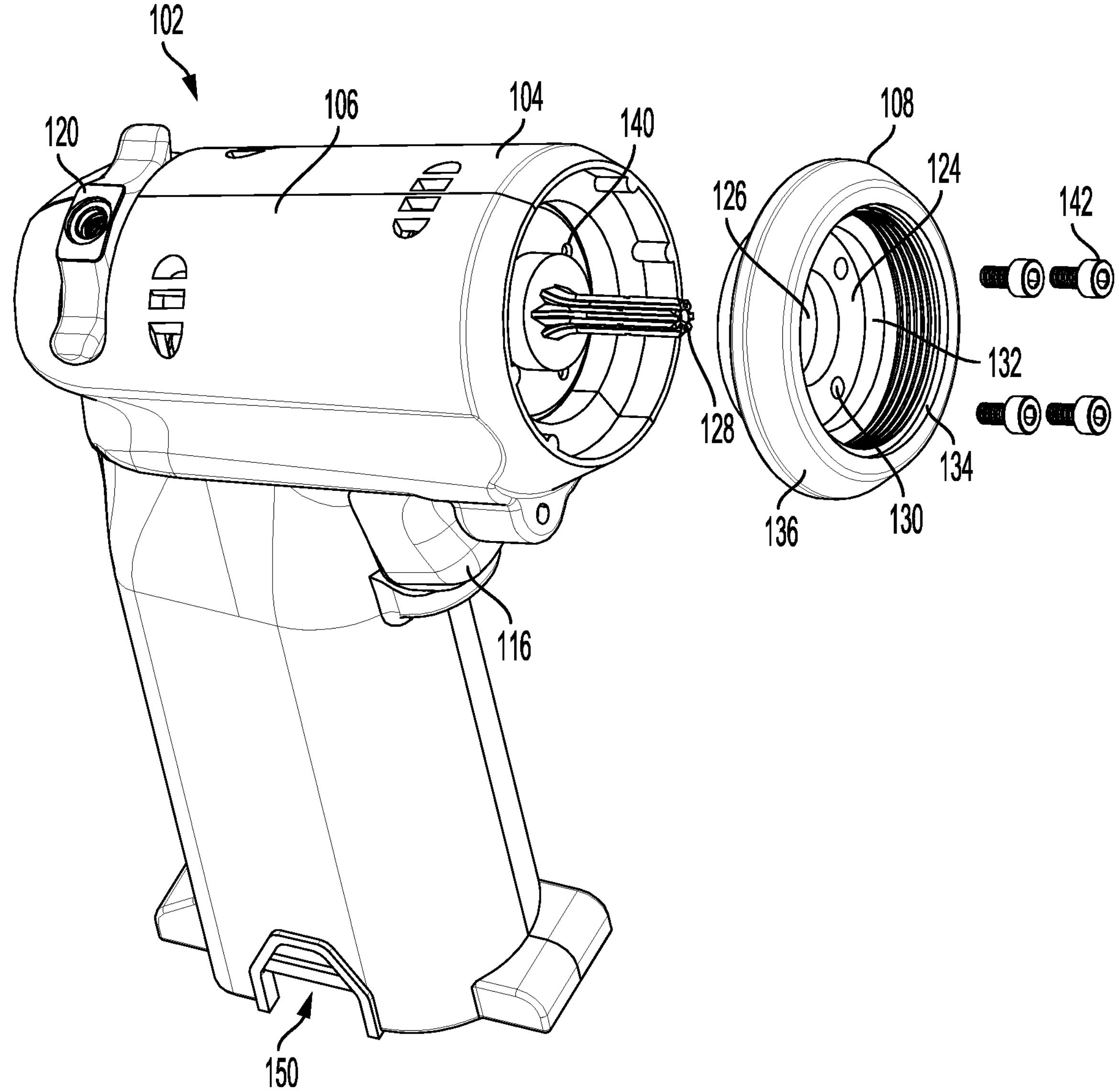
FIG. 6 is an exploded view of the housing clamp and housing of the tool according to an embodiment of the present invention.
Figure 7:
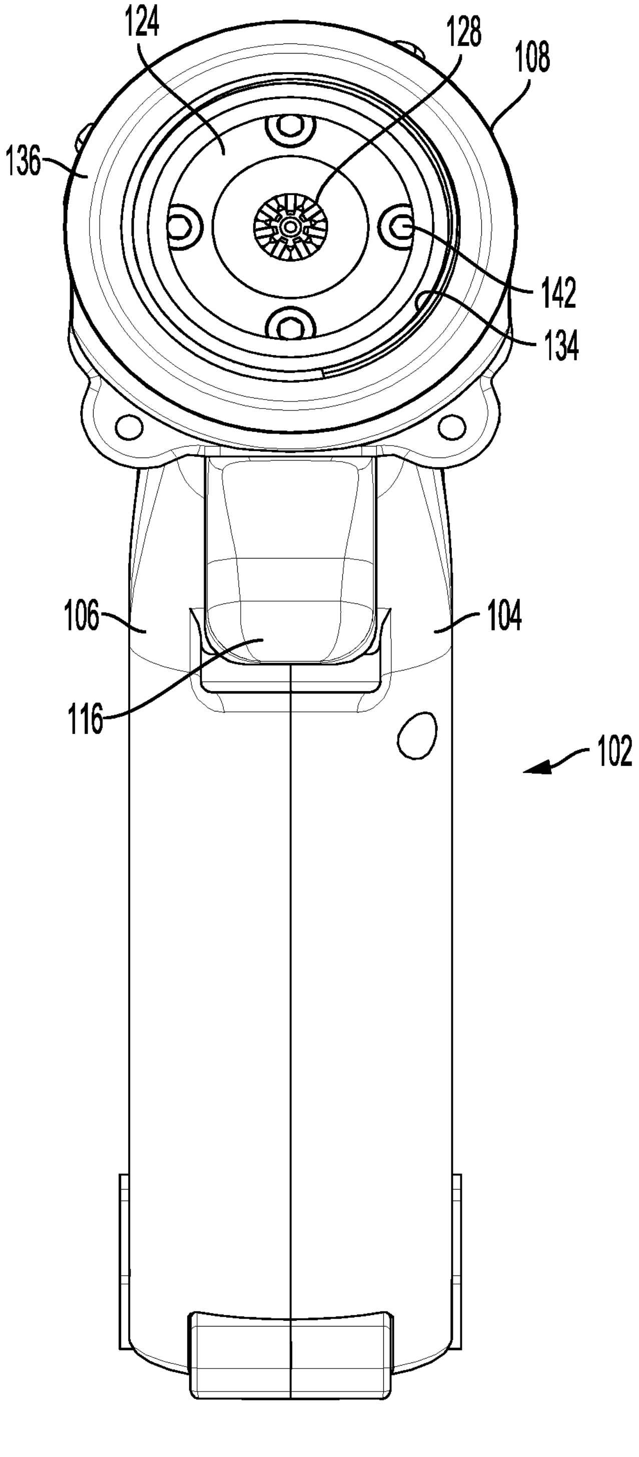
FIG. 7 is a front view of the housing clamp installed on the tool according to an embodiment of the present invention.
Figure 8:
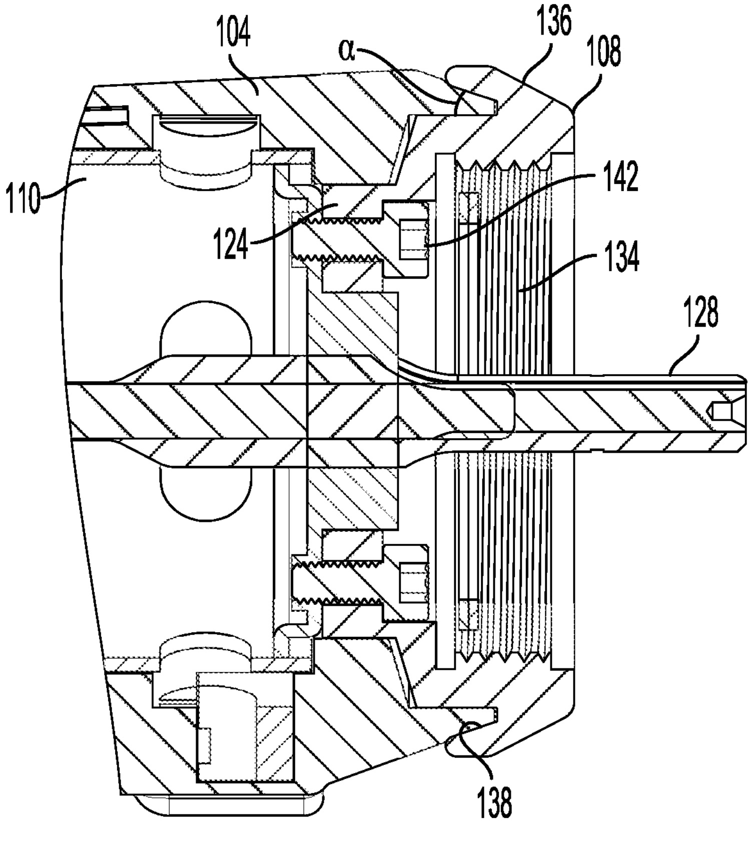
FIG. 8 is a cross-sectional view of the front of the housing and housing clamp of the tool.

Referring to FIGS. 6-8, the housing clamp 108 is installed on the tool housing 102 by disposing the base portion 124 proximal to a front end of the motor 110, with the shaft 128 of the motor 110 extending through the aperture 126. The fastener apertures 130 are aligned with corresponding axial fastener apertures 140 in the front end of the motor 110, and fasteners 142 are respectively threaded into the fastener apertures 130 and 140 to couple the housing clamp 108 to the tool housing 102. In an embodiment, each of the fasteners 142 are threaded or tightened a substantially equal amount (such as, an equal amount of torque), to assist the housing clamp 108 in providing an equal force around the circumference of the housing 102.

Prior to tightening the fasteners 142, the output ends of the first and second housing portions 104 and 106 are disposed in the recess 138. As illustrated in FIG. 8, the ends of the first and second housing portions 104 and 106 are also angled and are received in the recess 138. As the fasteners 142 are tightened, the housing clamp 108 axially moves along the axis of the housing 102 and the flange 136 of the housing clamp 108 applies even pressure or force around the circumference to the first and second housing portions 104 and 106. The angled nature of the recess 138 and flange 136, as well as the angled ends of the first and second housing portions 104 and 106 allows the housing clamp 108 to apply a lateral force or clamping load that clamps the first and second housing portions 104 and 106 together, as the fasteners 142 are tightened. The angled recess 138 and angled ends of the first and second housing portions 104 and 106 may also be in the form of curved or other types of shapes that provide a clamping load. The tighter the fasteners 142 are tightened, the further into the recess 138 the ends of the first and second housing portions 104 and 106 are disposed, and the greater force or clamping load is applied (due to narrowing of the recess 138) by the housing clamp 108. The housing clamp 108 provides even pressure around a large area at a working end of the tool 100, allowing the tool 100 to be thinner in a dimensionally critical area, such as proximal to the output nose mechanism 114 of the tool 100.

In an embodiment, the housing clamp is made of a metal material, while the first and second housing portions 104 and 106 are made of a plastic-type material. In this example, the housing clamp 108 may be directly coupled to the motor 110 and abut the end of the motor 110. Alternately, an insulator may be disposed between the housing clamp 108 and the motor 110. The insulator may be used to reduce an amount of heat transferred from the motor 110 to the housing clamp 108. Further, in other embodiments, the housing clamp 108 may be made from a material other than metal, such as a plastic-type material, or other polymer based material.

While the housing clamp 108 is described as being installed using fasteners 142, the housing clamp 108 may be installed by pressing or applying a force to position the housing clamp 108 on the first and second housing portions 104 and 106, and retaining the housing clamp 108 in position via a retaining ring or cross pin. In other embodiments, the axial force (such as created by the fasteners 142) can be created bay a bias member, such as a spring, that presses or pulls the housing clamp 108 on the first and second housing portions 104 and 106.

Referring back to FIGS. 1 and 2, as assembled, the housing 102 includes a motor housing portion 144 and a handle housing portion 146 formed by the assembled first and second housing portions 104 and 106. The motor housing portion 144 and handle housing portion 146 are disposed at an angle with respect to each other. For example, a longitudinal axis of the motor housing portion 144 and a longitudinal axis of the handle housing portion 146 are disposed at an angle of about 100 to about 120 degrees, and more particularly about 110 degrees with respect to each other.

The motor 110 is disposed in the motor housing portion 144, and includes a motor shaft 128 extending from a working end of the motor 110. The switch mechanism 112 is disposed in the handle housing portion 146, and is operably coupled to the motor 110. The actuatable trigger 116 is disposed substantially at an intersection of the handle and motor housing portions 144 and 146, and is operably coupled to the switch mechanism 112. Actuation of the trigger 116 (such as depression of the trigger 116) causes the motor 110 to operate and rotate the motor shaft 128 in either one of first and second rotational directions in a well-known manner. The trigger 116 may also be biased such that the trigger 116 is depressible inwardly, relative to the tool 100, to cause the tool 100 to operate, and a release of the trigger 116 causes the trigger 116 to move outwardly, relative to the tool 100, to cease operation of the tool 100 via the biased nature of the trigger 116.

The motor 110 may be a brushless or brushed type motor, or any other suitable motor. The trigger 116 and switch mechanism 112 may also be a variable speed type mechanism. In this regard, actuation or depression of the trigger 116 causes the motor 110 to rotate the motor shaft 128 at a faster speed the further the trigger 116 is depressed. The switch mechanism 112 may also be coupled to a controller 148 (which may include a printed circuit board) including battery contacts that couple to corresponding electrical contacts on a removable battery. In this regard, the handle housing portion 146 may include a battery opening 150 adapted to receive and couple to the removable battery. While, the tool 100 is described as being powered by a battery, the tool 100 may be power by other electrical power sources, such as an external wall outlet, etc.

The output nose mechanism 114 is adapted to couple to the housing clamp 108 via the threaded portion 134 at the working end of the tool 100, and may include a chuck 152 adapted to receive a variety of tool bits (including, driver bits, drill bits, cutting bits, socket bits, grinding bits, etc.). The output nose mechanism 144 may couple to the housing clamp 108, and receive and engage the shaft 128 of the motor 110. For example, the output nose mechanism 114 may include a gear or transmission mechanism that couples to the shaft 128 of the motor 110, and transfers rotation of the shaft 128 to the chuck 152. Thus, rotation of the shaft 128 of the motor 110 causes rotation of the chuck 152.

Referring to FIG. 2 the direction selector mechanism 118 includes the direction selector 120 and an actuation mechanism. The actuation mechanism is adapted to be disposed in the motor housing portion 144. The direction selector 120 is adapted to be moved between first and second positions (for example, by a user) to allow the user to select the desired rotation direction of the motor 110. For example, movement of the direction selector 120 to the first position causes selection of the first rotational direction, and movement of the direction selector 120 to the second position causes selection of the second rotational direction.

Figure 9:
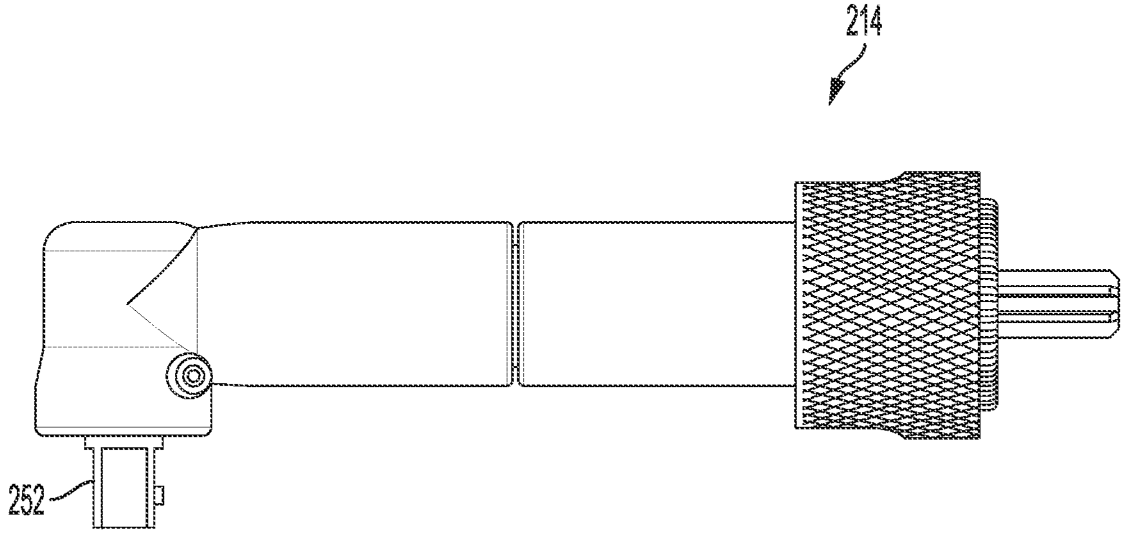
FIG. 9 is a side view of a router mechanism that can replace a drill and chuck mechanism of the tool.

While the tool 100 is described above as having an output nose mechanism 114 with a drill chuck 152, the tool 100 may have different types of output nose mechanisms. For example, referring to FIG. 9, the tool 100 may include a output nose mechanism 214 that includes a router type output 252. In this example, the output nose mechanism 214 may be coupled to the housing clamp 108 and may include a gear mechanism that couples to the shaft 128 of the motor 110, and transfers rotation of the shaft 128 to the router type output 252. Thus, rotation of the shaft 128 of the motor 110 causes rotation of the router type output 252.

Figure 10:
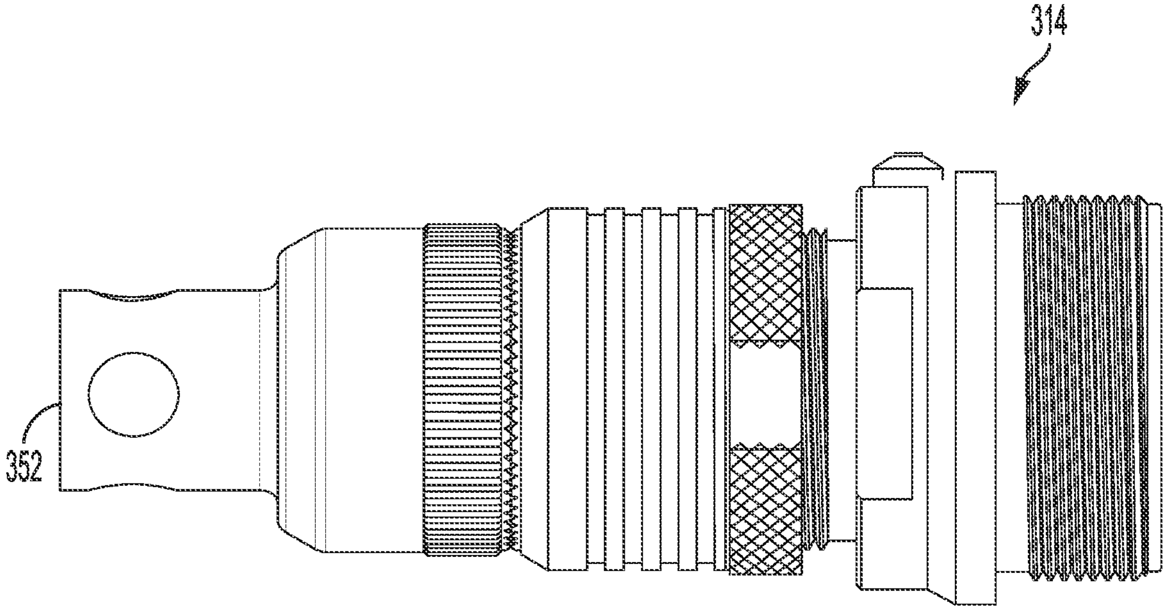
FIG. 10 is a side view of an impact mechanism that can replace the drill and chuck mechanism of the tool.

In another example, referring to FIG. 10, the tool 100 may include a output nose mechanism 314 that includes an impact type output with a drive lug 352. In this example, the output nose mechanism 314 may be coupled to the housing clamp 108 and may include a gear mechanism that couples to the shaft 128 of the motor 110, and transfers rotation of the shaft 128 to the drive lug 352. Thus, rotation of the shaft 128 of the motor 110 causes rotation of the drive lug 352. The impact type output may deliver high torque output by storing energy in a rotating mass, then delivering it in impacting forces to the output shaft of the drive lug 352. The drive lug 352 can be coupled to other devices, such as a socket or other adapter, to apply torque to a work piece, such as, for example, a screw or bolt, in a well-known manner.

As discussed herein, the tool 100 is a drill, router, or impact wrench. However, the tool 100 can be any electrically powered or hand-held tool, including, without limitation, a drill, router, or impact wrench, ratchet wrench, screwdriver, or other powered tool, that is powered by electricity via an external power source (such as a wall outlet and/or generator outlet) or a battery.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A clamp for a tool housing having first and second housing portions, the clamp comprising:

a base portion;

a side wall extending from the base portion; and a flange that extends circumferentially around the side wall and forms an angled recess between an inner side of the flange and an outer side of the side wall, wherein the recess is adapted to receive respective ends of the first and second housing portions to couple the first and second housing portions together.

2. The clamp of claim 1, wherein the flange is adapted to apply even force to the first and second housing portions circumferentially around the clamp.

3. The clamp of claim 1, wherein the base portion is adapted to receive a fastener to couple the housing clamp to the motor.

4. The clamp of claim 3, wherein the sidewall extends from the base portion to the flange.

5. The clamp of claim 4, wherein the sidewall includes a threaded portion.

6. The clamp of claim 1, wherein the clamp is made of a metal material, and the first and second housing portions are made of a plastic material.

7. A tool having first and second housing portions forming a housing, and a motor disposed in the housing, the tool comprising:

a housing clamp including:

a base portion;

a side wall extending from the base portion; and a flange that extends circumferentially around the side wall and forms an angled recess between an inner side of the flange and an outer side of the side wall, wherein the recess is adapted to receive ends of the first and second housing portions to couple the first and second housing portions together.

8. The tool of claim 7, wherein the housing clamp is adapted to apply even force to the first and second housing portions circumferentially around the housing clamp.

9. The tool of claim 7, wherein the base portion is adapted to receive a fastener to couple the housing clamp to the motor.

10. The tool of claim 9, further comprising an insulator adapted to be disposed between the base portion and the motor.

11. The tool of claim 9, wherein the sidewall extends from the base portion to the flange.

12. The tool of claim 11, wherein the sidewall includes a threaded portion adapted to couple to an output mechanism of the tool.

13. The tool of claim 7, wherein the housing clamp is made of a metal material, and the first and second housing portions are made of a plastic material.

* * * * *